F. KŇOUREK.
PACKING FOR ROTARY SHAFTS.
APPLICATION FILED APR. 22, 1914.

1,170,279.

Patented Feb. 1, 1916.
2 SHEETS—SHEET 1.

WITNESSES

INVENTOR
F. Kňourek

Attorney

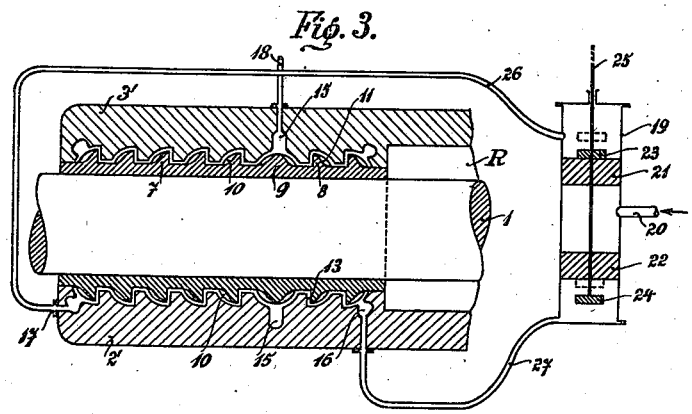
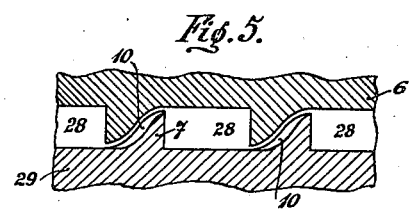
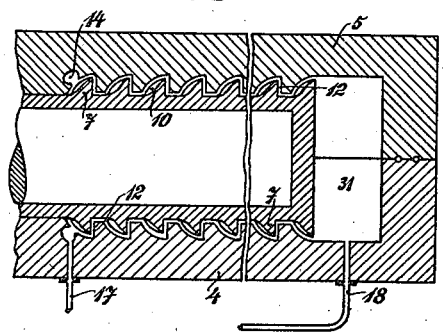

UNITED STATES PATENT OFFICE.

FRANZ KŇOUREK, OF BOHEMIA, AUSTRIA-HUNGARY.

PACKING FOR ROTARY SHAFTS.

1,170,279.
Specification of Letters Patent. Patented Feb. 1, 1916.

Application filed April 22, 1914. Serial No. 833,779.

*To all whom it may concern:*

Be it known that I, Dr. FRANZ KŇOUREK, subject of the Emperor of Austria-Hungary, residing at Bohemia, Austria-Hungary, have invented certain new and useful Improvements in Packing for Rotary Shafts, of which the following is a specification.

This invention relates to improvements in packing for rotary shafts at the points where they pass out of an inclosed space or casing in which there is inclosed a fluid at a pressure above or below that of the atmosphere.

The invention is more particularly directed to packing of the type known as labyrinth packing which is used for the purpose set forth. Labyrinth packings as hitherto known entail a considerable axial length of packing or bearing which involves, in the case of rapidly rotating shafts and spindles, considerable loss through friction.

According to the present invention the objections hitherto associated with labyrinth packing are avoided by providing centrifugal blades on the annular stages or projections of the labyrinth packing on the side remote from that of the pressure to be overcome.

In the case of shafts which are to be reversed the stages of the labyrinth packing may be provided with two sets of blades or blade grooves oppositely arranged. The lubricating medium may be arranged to flow from one end to the other and its flow may be induced by the centrifugal blades. In cases where the shaft is reversible automatic means may be provided for permitting the circulation of the lubricating medium in one or the other direction.

Figure 1:
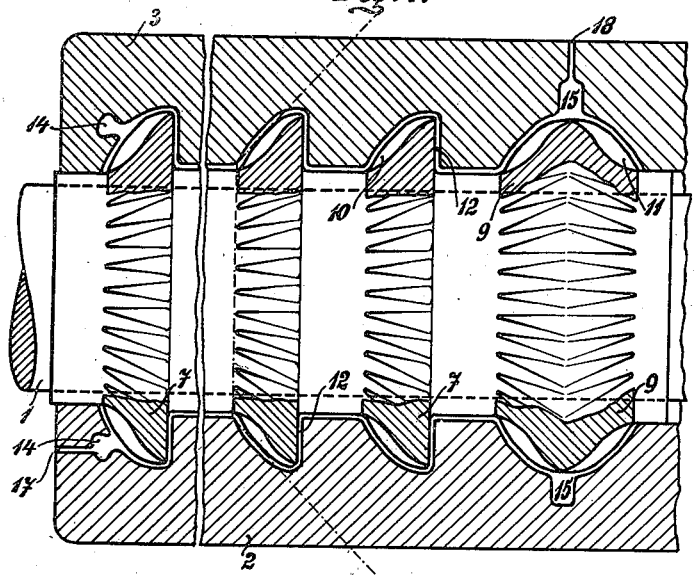
Figure 2:
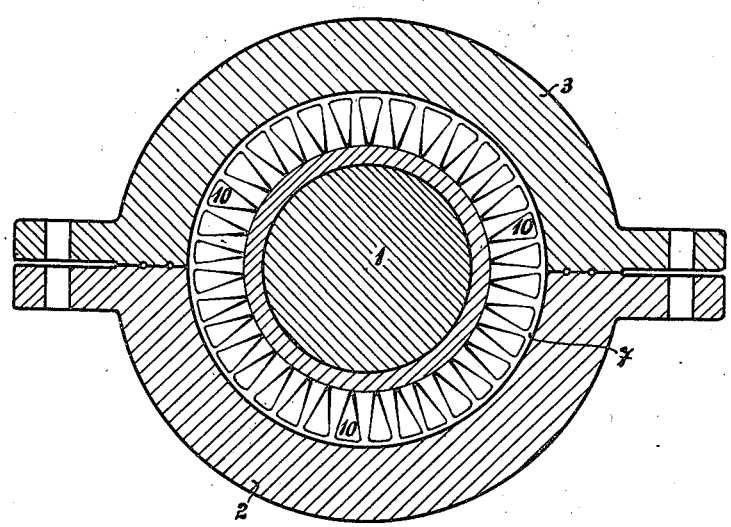

The invention is illustrated by way of example in the accompanying drawings in which:

Figure 1 is an axial section through the bearing and Fig. 2 is a cross section of the device shown in Fig. 1. Fig. 3 shows a section of the bearing with lubricating arrangement. Fig. 4 is a view of a bearing and packing according to the present invention arranged for overcoming pressure in one direction only. Fig. 5 is a partial view of a bearing showing the arrangement of the parts in cases where the shaft is subjected to longitudinal movements.

In carrying the invention into effect according to the form shown, the shaft 1 passes through the sleeve 2 which is provided internally with a number of annular grooves. The shaft 1 has fixed thereon a number of collars or rings 7, 9 and these rings are provided on the side which faces the fluid under pressure with grooves 10, 11, while their rear sides 12 are flat and not grooved. The rings 7, 9 are adapted to rotate in the grooves of the sleeve 2 and sufficient clearance is left between the rings and the grooves to permit of the passage and circulation of the lubricant under pressure. The lubricant is introduced at 17 into an annulus 14 located opposite the first series of grooves in the first ring 7. The liquid is forced outwardly in a combined radial and axial direction and the outer part of the grooved rings 7 is rounded so that the liquid passes gradually from the radial to the axial direction of flow and then returns again through a curved passage to a radial direction so as to enter the next stage. The liquid passes from one stage to the next under gradually increasing pressure until it reaches the last stage where at its outermost point it is collected in an annular chamber 15 (see Figs. 1 and 3) or in a collecting chamber 31 (see Fig. 4) from which the liquid is removed to a filter or other apparatus when if desired it may be used again. The oil in the annulus 15 may be prevented from passing axially of the shaft 7 by providing the last ring 9 with blades or grooves 10, 11 on both sides, the grooves 11 being arranged oppositely to the grooves 10. In this way the oil which would have the tendency to flow axially is returned by the blades 11 into the annulus 15 and from this annulus practically all the oil may be withdrawn through the passage 18.

In some cases the shaft of the motor or the like must be free to move axially. In such cases the rings 7 must be given a larger clearance such as is shown at 28 in Fig. 5. In most cases it is sufficient for the rings 7 to be provided on one side only with grooves or blades and the last ring of the series may be provided with double blades. In cases where the chamber R in Fig. 3 is sometimes subjected to pressure and sometimes to vacuum it is advisable to provide two sets of blades or grooves on the labyrinth rings. Such oppositely arranged rings are shown at 18 in Fig. 3 where the curved and grooved sides of the rings 8 are oppositely arranged to the curved and grooved sides of the rings 7, The lubricant enters by the pipe 27 into the annulus 16 and is forced under pressure by the grooves on the ring 9 into the annulus 15 from whence it finds its outlet at 18. The lubricating arrangements in this form may be under the control of a regulator as shown. This regulator consists of a cylindrical chamber 19 to the center part of which at 20 the lubricant is fed. The lubricant may pass from the center portion by the valves 23 or 24 which rest on seats 21 and 22 respectively. The valve by which the liquid passes is determined by the position of the rod 25 and the position of this rod is determined in turn by the pressures in the pipes 26, 27 respectively. The pressures in the pipes 26 and 27 are determined by the pressures in the annuli 14 and 16 and consequently the direction of flow of the oil is determined by the pressure in the chamber R. When the pressure in the chamber R is higher than atmospheric the liquid passes from the tube 20 past the valve 23 through the tube 26 into the annulus 14 and thence through the various grooved rings 7 to the outlet 18. At the same time as the valve 23 opens, the valve 24 is closed. The number of stages 7 is preferably greater than the number of stages 8 so that any oil in the stages 8 reaches the annulus 15 at a lower pressure than the oil passing through the stages 7. If now the space R is subjected to a vacuum the pressure in the annulus 16 will fall and this fallen pressure will be communicated to the lower end of the cylinder 19 whereby the valve 24 will be opened and the valve 23 closed. The blades or grooves 10, 11, of the rings may be either radial or curved.

I claim:

1. A labyrinth packing comprising a sleeve having internal annular grooves therein, said grooves having a rounded and a flat surface, a rotary shaft passing through said sleeve, collars on said shaft and rotating with free clearance in said annular grooves, means for supplying a circulating fluid to the end of said sleeve adjacent the rounded portion of the groove, and centrifugal blades on the side of said collars facing the supply of circulating fluid.

2. A labyrinth packing comprising a sleeve having internal annular grooves therein, said grooves having a rounded and a flat surface, a rotary shaft passing through said sleeve, collars on said shaft and rotating with free clearance in said annular grooves, means for supplying a circulating fluid to one end of said sleeve and centrifugal blades on the side of said collars facing the supply of circulating fluid, said blades being inclined relatively to both the radius and axis of said shaft and having rounded edges adjacent the rounded edges of the grooves.

3. A labyrinth packing comprising a sleeve having internal annular grooves therein, said grooves having a rounded portion, a rotary shaft passing through said sleeve, collars on said shaft and rotating with free clearance in said annular grooves, means for supplying a circulating fluid to the ends of said sleeve, centrifugal blades on the side of said collars facing the supply of circulating fluid, said blades having a cut-away portion adjacent the rounded portion of the grooves, a central receiving chamber for the circulating fluid and located at the junction of the series of collars with oppositely arranged blade members thereon.

4. A labyrinth packing comprising a sleeve having internal annular grooves therein, said gooves having a rounded and a flat portion, a rotary shaft passing through said sleeve, collars on said shaft and rotating with free clearance in said annular grooves, means for supplying a circulating fluid to one end of said sleeve, adjacent the rounded portion of the grooves, and centrifugal blades on the side of said collars facing the supply of circulating fluid, and adjacent the rounded portion of the grooves, a receiving chamber for the circulating fluid, and a collar on the shaft opposite said receiving chamber, said collar having blade members on both sides thereof.

5. A labyrinth packing comprising a sleeve having internal annular grooves therein, a rotary shaft passing through said sleeve, collars on said shaft and rotating with free clearance in said annular grooves, means for supplying a circulating fluid to the ends of said sleeve and centrifugal blades on the side of said collars facing the supply of circulating fluid, a central receiving chamber for the circulating fluid and located at the junction of the series of collars with oppositely arranged blade members thereon, and automatic means for directing the supply of circulating fluid to either end of said sleeve, according to the increase and decrease in pressure therewithin.

6. A labyrinth packing comprising a sleeve having a plurality of internal annular grooves therein, said grooves having two intersecting surfaces, one of the said surfaces at right angles to the shaft and the other surface arcuate to the first-mentioned surface, a receiving chamber adjacent the innermost groove, the said sleeve having another plurality of annular grooves therein having two intersecting surfaces, one of the said surfaces at right angles to the shaft and the other said surface arcuate thereto, the said arcuate surface following the circle on the opposite side of the right angular groove from the first-mentioned arcuate surface, a rotary shaft passing through said sleeve, collars on said shaft and rotating with free clearance in said annular grooves, means for supplying a circulating fluid to the receiving chambers.

7. A labyrinth packing comprising a sleeve having internal annular grooves therein, a rotary shaft passing through said sleeve, collars on said shaft and rotating with free clearance in said annular grooves, and automatic means for directing the supply of circulating fluid to either end of said sleeve, said means comprising a receiving chamber, two auxiliary chambers in communication therewith, and a valve in each chamber, said valves operated according to the increase or decrease in pressure in the ends of said sleeves.

8. A labyrinth packing comprising a sleeve having internal annular grooves therein, a rotary shaft passing through said sleeve, collars on said shaft and rotating with free clearance in said annular grooves, and automatic means for directing the supply of a circulating fluid to either end of said sleeve, said means comprising a receiving chamber for the circulating fluid, two auxiliary chambers arranged upon opposite sides of the receiving chamber and having communication therewith, passages connecting each auxiliary chamber to opposite ends of the sleeve, a valve in each chamber adapted to close communication between it and the receiving chamber, the said valves connected together, whereby the opening of one closes the other, the said valves operated according to the increase and decrease in pressure in the auxiliary chambers caused by the increase and decrease of pressure in the ends of said sleeves.

9. A labyrinth packing comprising a sleeve having internal annular grooves therein, said grooves having a rounded and a flat surface, a rotary shaft passing through said sleeves, collars on said shaft and rotating with free clearance in said annular grooves, a fluid reservoir, a pipe communicating with the reservoir for supplying a circulating fluid from the reservoir to the end of the said sleeve adjacent the rounded portion of the groove, pipes conveying the fluid from the other end of the sleeve where it is under pressure back to the reservoir, the pipes apart from the sleeve and providing means for cooling the fluid after its passage through the sleeve.

In testimony whereof I have signed my name to this specification in the presence of two subscribing witnesses.

DR. FRANZ KŇOUREK.

Witnesses:
LADISLAV VOJÁŘEL,
VOJTĚCH KAPELLA.